United States Patent
Kuno et al.

(10) Patent No.: US 10,899,023 B2
(45) Date of Patent: Jan. 26, 2021

(54) FAILURE DIAGNOSIS DEVICE AND FAILURE DIAGNOSIS METHOD

(71) Applicant: NISSAN MOTOR CO., LTD., Kanagawa (JP)

(72) Inventors: Masaki Kuno, Kanagawa (JP); Toshimichi Urakawa, Kanagawa (JP); Toru Takagi, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 15/578,090

(22) PCT Filed: May 29, 2015

(86) PCT No.: PCT/JP2015/065503
§ 371 (c)(1),
(2) Date: Nov. 29, 2017

(87) PCT Pub. No.: WO2016/194029
PCT Pub. Date: Dec. 8, 2016

(65) Prior Publication Data
US 2018/0147735 A1    May 31, 2018

(51) Int. Cl.
*B25J 19/06* (2006.01)
*B25J 9/16* (2006.01)
(Continued)

(52) U.S. Cl.
CPC .............. *B25J 19/06* (2013.01); *B25J 9/1674* (2013.01); *G01L 5/0076* (2013.01);
(Continued)

(58) Field of Classification Search
CPC ........ B25J 19/06; G01L 5/0076; G01M 13/00
(Continued)

(56) References Cited

U.S. PATENT DOCUMENTS 5,111,383 A *  5/1992  Kimura .............. G05B 19/0428
                                                      318/563
7,882,394 B2 *  2/2011  Hosek ................ G05B 23/0235
                                                      702/184
(Continued)

FOREIGN PATENT DOCUMENTS

JP    H07-100782 A    4/1995
JP    H09-081215 A    3/1997
(Continued)

OTHER PUBLICATIONS

International Preliminary Report on Patentability issued in Application No. PCT/JP2015/065503, dated Nov. 30, 2017 (8 pages).

*Primary Examiner* — Yoshihisa Ishizuka
(74) *Attorney, Agent, or Firm* — Osha Bergman Watanabe & Burton LLP

(57)    ABSTRACT

A failure diagnosis device applicable to a mechanical device provided with motors independent of One another as sources to drive motion axes, respectively, and configured to acquire a moving position of each motion axis and a disturbance torque value applied to the motion axis every predetermined period, and to diagnose a failure of the mechanical device, includes a failure diagnosis unit configured to diagnose the motion axis as a failure when the disturbance torque value is larger than a predetermined failure determination threshold, and a re-determination unit configured to conduct re-determination of the failure on the motion axis, which is diagnosed as the failure by the failure diagnosis unit, based on a previous maintenance record and a previous inspection result.

6 Claims, 5 Drawing Sheets

(51) Int. Cl.
*G05B 19/406* (2006.01)
*G01L 5/00* (2006.01)

(52) U.S. Cl.
CPC .. *G05B 19/406* (2013.01); *G05B 2219/37624* (2013.01); *G05B 2219/39355* (2013.01)

(58) Field of Classification Search
USPC .......................................................... 702/184
See application file for complete search history.

(56) References Cited

U.S. PATENT DOCUMENTS

| | | | | |
|---|---|---|---|---|
| 8,042,332 | B1* | 10/2011 | Ishino | B60K 17/105 60/454 |
| 2003/0033093 | A1* | 2/2003 | Nelson | G06F 30/00 702/34 |
| 2010/0157304 | A1* | 6/2010 | Takahashi | F16C 19/52 356/442 |
| 2011/0093157 | A1* | 4/2011 | Prabhakaran | G07C 5/006 701/29.5 |
| 2011/0173496 | A1* | 7/2011 | Hosek | G05B 23/0235 714/26 |
| 2013/0250303 | A1* | 9/2013 | Shirata | B25J 9/102 356/436 |
| 2015/0051846 | A1* | 2/2015 | Masuya | G01M 13/04 702/34 |

FOREIGN PATENT DOCUMENTS

| | | |
|---|---|---|
| JP | H09-174482 A | 7/1997 |
| JP | 2002-175104 A | 6/2002 |
| JP | 2007-007762 A | 1/2007 |
| JP | 2007-219991 A | 8/2007 |
| JP | 2008-249549 A | 10/2008 |
| JP | 2009-226488 A | 10/2009 |
| JP | 2013-013988 A | 1/2013 |

* cited by examiner

FAILURE DIAGNOSIS DEVICE AND FAILURE DIAGNOSIS METHOD

BACKGROUND

Technical Field

The present invention relates to a failure diagnosis device applicable to a mechanical device provided with motors independent of one another as sources to drive motion axes, respectively, and to a method thereof.

Related Art

Patent Literature 1 has been disclosed as a conventional failure diagnosis method applicable to an articulated industrial robot. In the failure diagnosis method disclosed in Patent Literature 1, a moving position of a joint axis of a robot and disturbance torque applied to the joint axis are detected every predetermined period while the robot is in operation, and an average value of the disturbance torque is obtained for each detected moving position. Then, the average value is compared with a set threshold and the robot is diagnosed as having an abnormality or a failure when the average value exceeds the set threshold. As described above, the conventional technique has been designed to diagnose a failure based on determination as to whether or not the disturbance torque exceeds the certain set threshold. Thus, an abnormality in a robot drive system used to be detected irrespective of a motion posture of the robot or a weight of a workpiece or the like to be gripped with a robot hand.

Patent Literature 1: Japanese Patent Application Publication No. H 9-174482

SUMMARY OF INVENTION

However, if a maintenance task is conducted in such a way as to alter a grease viscosity by changing a grease in a motion axis, a disturbance torque value varies due to an effect of the maintenance task. In this case, continued operation of failure diagnoses based only on the disturbance torque values may lead to frequent occurrence of erroneous determination as being abnormal in spite of being normal as a matter of fact, thus causing deterioration in failure diagnosis accuracy.

In the meantime, there are a wide variety of disturbance factors that affect the disturbance torque values, and it is therefore difficult to eliminate all the disturbance factors from the disturbance torque values. Accordingly, the continued operation of failure diagnosis based only on the disturbance torque values causes deterioration in failure diagnosis accuracy.

As described above, there are frequent occurrences of erroneous determination and deteriorations in failure diagnosis accuracy when failures in a robot drive system are diagnosed based only on the disturbance torque values.

A failure diagnosis device and a method thereof according to one or more embodiments of the present invention may be capable of improving failure diagnosis accuracy while preventing erroneous determination by using a maintenance record and an inspection result other than a disturbance torque value for diagnosing a failure.

A failure diagnosis device and a method thereof according to one or more embodiments of the present invention diagnose a motion axis as a failure when a disturbance torque value is larger than a predetermined failure determination threshold, and conducts re-determination of the failure on the motion axis, which is diagnosed as the failure, based on a previous maintenance record and a previous inspection result.

DETAILED DESCRIPTION

Embodiments of the present invention will be described below with reference to the drawings. In the description of the drawings, the similar elements are denoted by the same reference signs and explanations thereof are omitted. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

[Configuration of Failure Diagnosis System]

Figure 1:
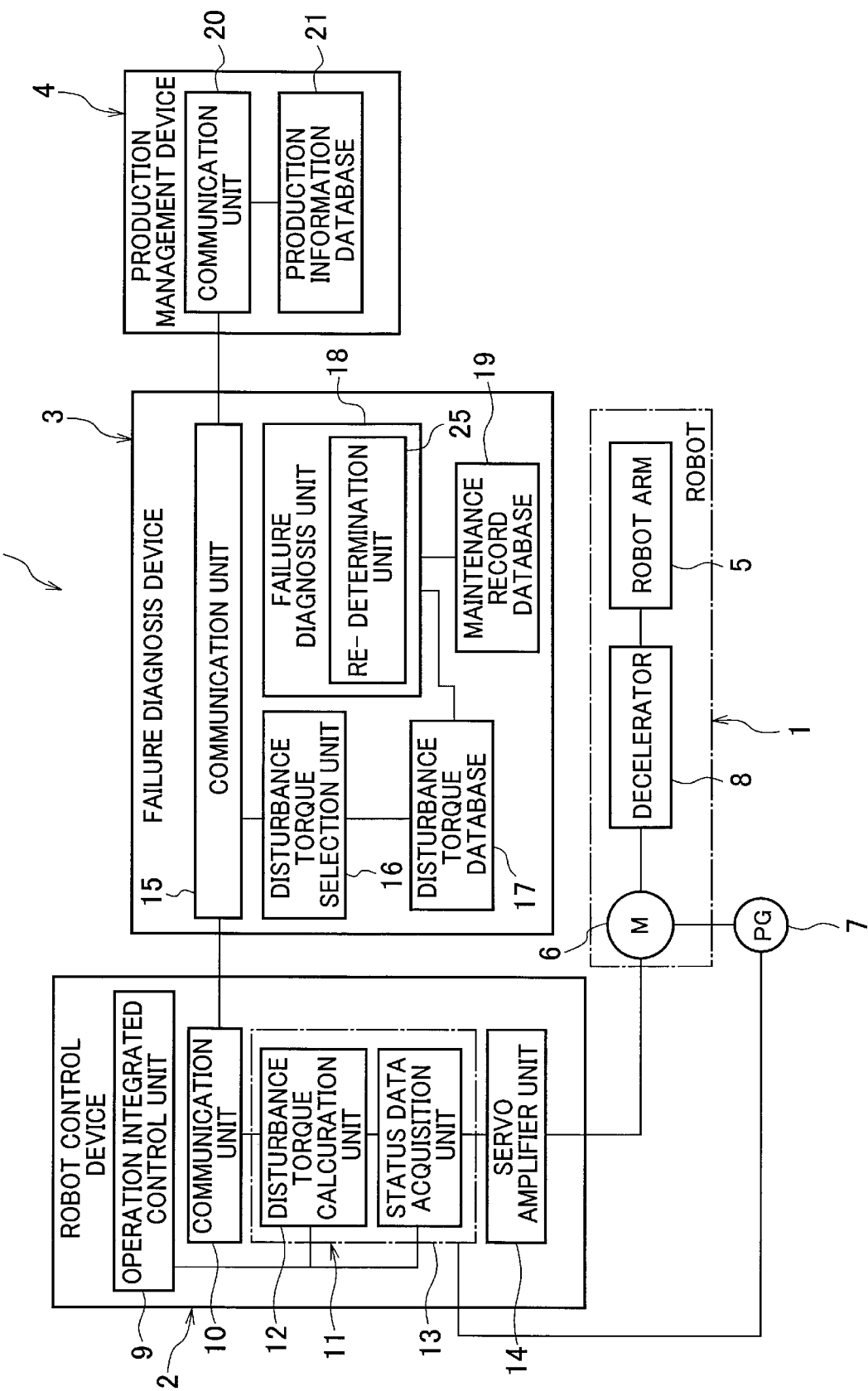
FIG. 1 is a block diagram showing an overall configuration of a failure diagnosis system according to one or more embodiments of the present invention.

FIG. 1 is a block diagram showing a configuration of a failure diagnosis system including a failure diagnosis device according to one or more embodiments. As shown in FIG. 1, a failure diagnosis system 100 of one or more embodiments is formed from a robot 1, a robot control device 2, a failure diagnosis device 3, and a production management device 4. As an example of a mechanical device, the robot 1 is a robot of a multi-axis-machine teaching-play back type and also of an articulated type. However, the robot 1 may be a single-axis machine instead of being the multi-axis machine.

Although the robot 1 includes multiple motor drive systems serving as joint axes that are motion axes, FIG. 1 illustrates a motor drive system just for one axis. A robot arm 5 is driven by a servo motor (hereinafter simply referred to as a motor) 6 through a decelerator 8. A pulse coder (a pulse generator or an encoder) 7 being a detector for a rotation angle position and a velocity is attached to the motor 6.

The robot control device 2 includes an operation integrated control unit 9, a communication unit 10, a servo control unit 11, and a servo amplifier unit 14. The servo control unit 11 includes a disturbance torque calculation unit 12 and a status data acquisition unit 13, and drives the motor 6 through the servo amplifier unit 14 by receiving an instruction from the host operation integrated control unit 9. The pulse coder 7 attached to the motor 6 forms a feedback loop in conjunction with the servo control unit 11 in order for control processing of the rotation angle position and the velocity of the motor 6.

In addition to the disturbance torque calculation unit 12 and the status data acquisition unit 13, the servo control unit 11 includes a processor which performs processing for controlling the rotation angle position, the velocity, and a current of the motor 6, a ROM which stores a control program, and a non-volatile storage unit which stores set values and various parameters. Moreover, the servo control unit 11 includes a RAM which temporarily stores data in the course of calculation processing, a register for detecting an absolute rotation angle position of the motor 6 by counting position feedback pulses from the pulse coder 7, and the like.

Incidentally, the robot 1 includes multiple joints and therefore requires as many motor drive systems as illustrated in FIG. 1 as the number of joints. Nonetheless, FIG. 1 illustrates the motor drive system just for one axis and illustration of the rest of the motor drive systems is omitted therein. In the meantime, a speed change gear train may be interposed between the motor 6 and the decelerator 8 in FIG. 1 as appropriate.

The operation integrated control unit 9 is ranked higher than the servo control unit 11 and governs direct control of operations of the robot 1. The communication unit 10 transfers necessary data to and from a communication unit 15 in the failure diagnosis device 3 to be described later through a LAN, for example. Meanwhile, the status data acquisition unit 13 has a function to regularly collect various types of data concerning operating statuses of the respective joint axes of the robot 1. The collected data include data indicating a collection period. The disturbance torque calculation unit 12 has a function to calculate a disturbance torque value based on the data acquired by the status data acquisition unit 13. Since the servo control unit 11 is designed to include the disturbance torque calculation unit 12 and the status data acquisition unit 13, the disturbance torque value obtained by the calculation of the disturbance torque calculation unit 12 is outputted to the failure diagnosis device 3 through the communication unit 10. According to this configuration, the servo control unit 11 takes the form of so-called software servo.

The failure diagnosis device 3 includes the communication unit 15, a disturbance torque selection unit 16, a disturbance torque database 17, a failure diagnosis unit 18, and a maintenance record database 19. Here, the failure diagnosis device 3 is formed of a general-purpose electronic circuit inclusive of a microcomputer, a microprocessor, and a CPU, and of a peripheral device such as a memory. Accordingly, the failure diagnosis device 3 operates as the communication unit 15, the disturbance torque selection unit 16, the disturbance torque database 17, and the failure diagnosis unit 18 by executing specific programs.

The communication unit 15 has a function to transfer the necessary data to and from the respective communication units 10 and 20 in the aforementioned robot control device 2 and in the production management device 4 through the LAN, for example. The disturbance torque selection unit 16 has functions to acquire necessary production information from the production management device 4 and to select a value to be stored out of the disturbance torque values collected depending on the operational status of the robot 1. Meanwhile, the disturbance torque database 17 has a function to sequentially store the disturbance torque values selected by the disturbance torque selection unit 16. As a consequence, the disturbance torque database 17 accumulates previous disturbance torque values.

The maintenance record database 19 has a function to store maintenance records and inspection results depending on the respective joint axes when maintenance tasks and inspections are conducted on the robot 1. As a consequence, the maintenance record database 19 accumulates previous maintenance record data and previous inspection result data.

The failure diagnosis unit 18 has a function to execute a failure diagnosis actively based on the disturbance torque values. The failure diagnosis unit 18 is equipped with a memory function. Hence, the failure diagnosis unit 18 temporarily stores data acquired by accessing the disturbance torque database 17 and the maintenance record database 19, respectively, and executes the failure diagnosis based on those data. In particular, the failure diagnosis unit 18 acquires a moving position of each motion axis and a disturbance torque value applied to each motion axis at each moving position every predetermined period, and diagnoses that a failure is occurring if the acquired disturbance torque value is larger than a predetermined failure determination threshold. Furthermore, the failure diagnosis unit 18 includes a re-determination unit 25.

The re-determination unit 25 conducts the re-determination of the failure on the motion axis, which is diagnosed as the failure, based on a previous maintenance record and a previous inspection result. Specifically, the re-determination unit 25 conducts the re-determination by using a replacement record of the decelerator as the maintenance record. For example, when the decelerator of the motion axis has been replaced recently, it is highly likely that the motion axis is normal even if the motion axis is diagnosed as the failure based on the disturbance torque value. Accordingly, the re-determination unit 25 conducts the re-determination by using the replacement record of the decelerator. Moreover, the re-determination unit 25 conducts the re-determination by using a measurement result of an iron powder concentration as the inspection result. Iron powder contents gradually increase in the grease changed in the motion axis due to degradation over time or an increase in load. Accordingly, it is highly likely that a failure is occurring in the motion axis when an increase in iron powder concentration is equal to or larger than a predetermined threshold. The re-determination unit 25 therefore conducts the re-determination by using the measurement result of the iron powder concentration in the grease changed in the motion axis. Here, data on the replacement record of the decelerator and the measurement result of the iron powder concentration are stored in the maintenance record database 19. Accordingly, the re-determination unit 25 executes the re-determination by acquiring the data from the maintenance record database 19.

Specifically, when there is a measurement record of the iron powder concentration within a predetermined period in the past regarding the motion axis subject to the re-determination, the re-determination unit 25 determines that the motion axis subject to the re-determination is normal if the measurement value of the iron powder concentration recorded in the measurement record is equal to or less than the predetermined threshold.

On the other hand, when there is no measurement record of the iron powder concentration within the predetermined period in the past regarding the motion axis subject to the re-determination, the re-determination unit 25 calculates an estimated value by estimating a current iron powder concentration, and determines that the motion axis subject to the re-determination is normal if the estimated value is equal to or less than the predetermined threshold.

Furthermore, when there is no measurement record of the iron powder concentration within the predetermined period in the past regarding the motion axis subject to the re-determination, the re-determination unit 25 determines that the motion axis subject to the re-determination is normal if there is the replacement record of the decelerator within the predetermined period in the past regarding the motion axis subject to the re-determination.

By executing the re-determination as described above, the re-determination unit 25 can diagnose the failure of the motion axis by using the maintenance record and the inspection result other than the disturbance torque value. This makes it possible to improve failure diagnosis accuracy while preventing erroneous determination to diagnose as a failure in spite of being normal as a matter of fact. However, if there are other data than the measurement result of the iron powder concentration and the replacement record of the decelerator, which can be used for diagnosing the failure of the motion axis, then the re-determination may be executed by using such other data.

The production management device 4 is a device to manage production information including an operating status of a production line in a plant, for example. The production management device 4 includes a communication unit 20 and a production information database 21. The communication unit 20 transfers the necessary data to and from the communication unit 15 in the failure diagnosis device 3 through the LAN, for example. The production information database 21 has a function to store a variety of collected production information. As a consequence, the production information database 21 accumulates a variety of previous production information. Here, the production information includes emergency stop information on the robot 1 and its incidental equipment as well as information on maintenance records and the like.

Here, in one or more embodiments, disturbance torque (disturbance load torque) applied to the motor 6 that drives each joint axis of the robot 1 is detected and an abnormality of the corresponding motor drive system is diagnosed as a failure of the robot based on this disturbance torque value. Procedures to obtain the disturbance torque are as follows.

Figure 2:
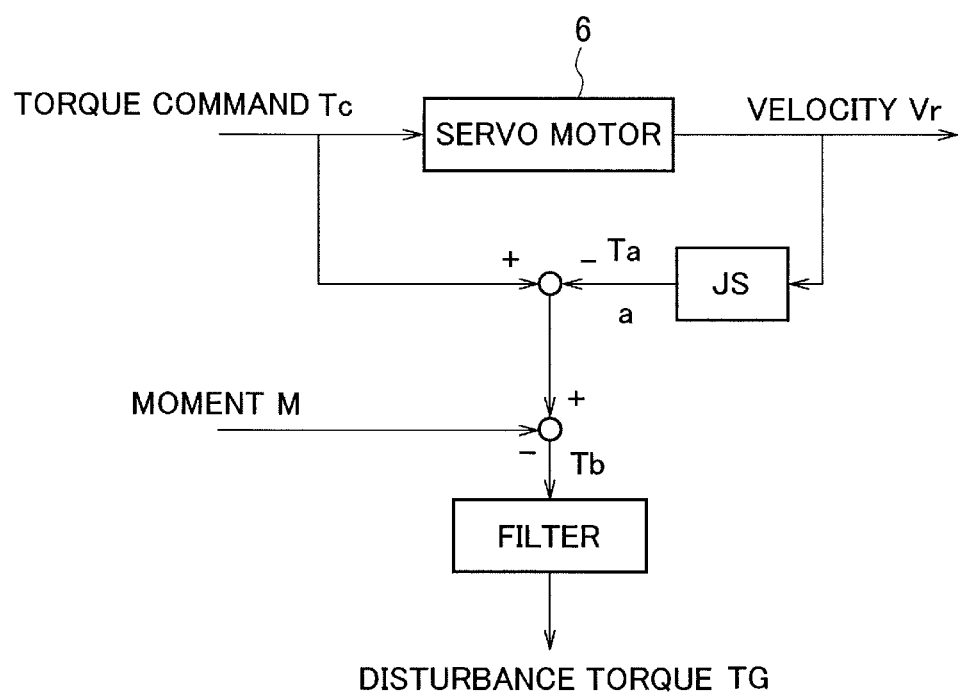
FIG. 2 is a block diagram for explaining procedures to obtain disturbance torque.

As shown in a block diagram in FIG. 2, an acceleration rate is obtained by differentiating actual velocities Vr of the motor 6 derived from velocity feedback signals from the pulse coder 7, and then acceleration torque Ta is obtained by multiplying the acceleration rate by all inertia J to be applied to the motor 6. Next, the obtained acceleration torque Ta is subtracted from a torque command Tc to the motor 6 obtained by velocity loop processing by the servo control unit 11, and a moment M is further subtracted therefrom to obtain disturbance torque Tb. Thereafter, irregular components of the disturbance are removed by conducting given filtering processing, and disturbance torque TG is thus obtained. The servo control unit 11 executes the above-described processing every predetermined sampling period, thereby obtaining the disturbance torque TG.

To be more precise, the servo control unit 11 includes a register, and the register obtains an absolute position of the motor 6 by counting the position feedback pulses from the pulse coder 7 every predetermined sampling period. Accordingly, the servo control unit 11 detects the absolute position of the motor 6 from the register, and obtains the rotation angle position (the moving position) of the joint axis driven by the motor 6 from the absolute position of the motor 6. Moreover, the servo control unit 11 obtains the disturbance torque TG by performing the processing of FIG. 2 as described previously.

[Disturbance Torque Selection Processing]

Figure 3:
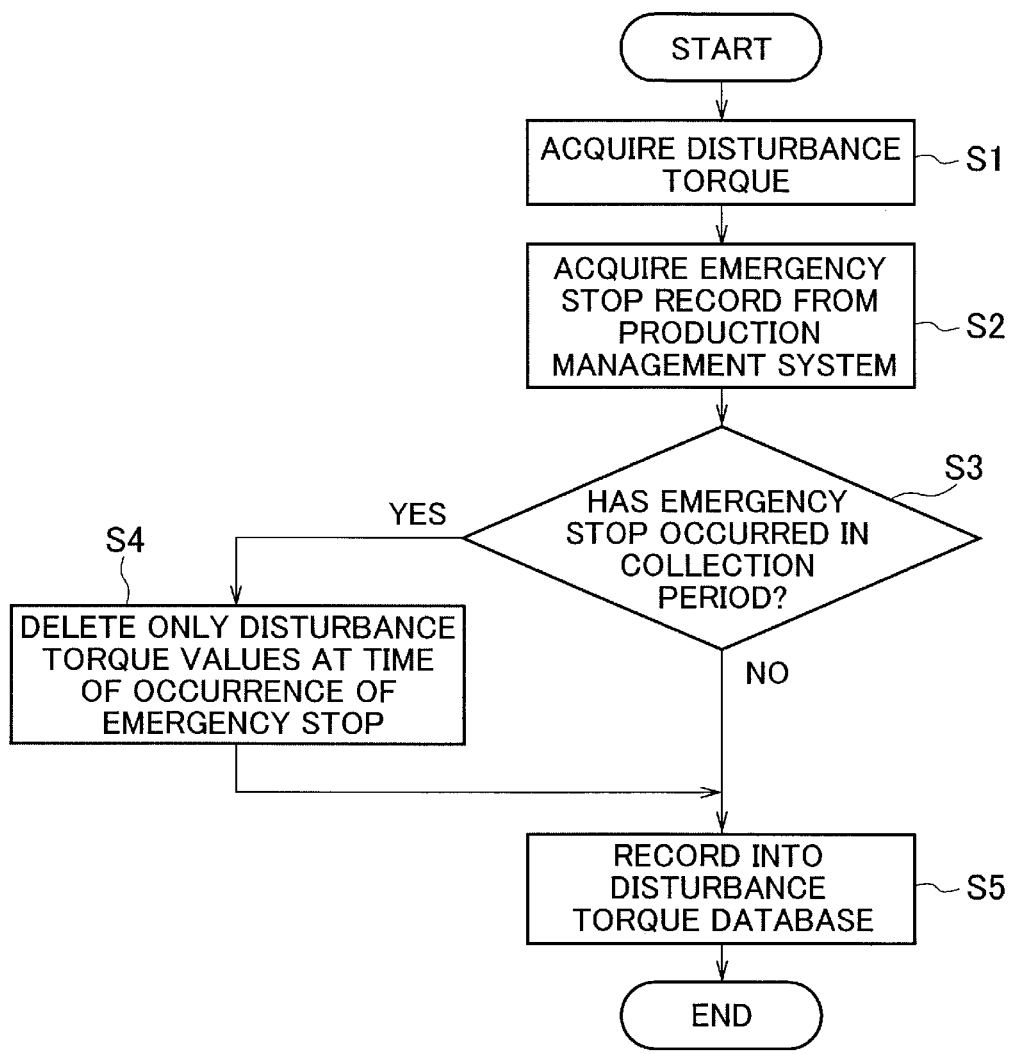
FIG. 3 is a flowchart showing procedures of disturbance torque selection processing by a failure diagnosis device according to one or more embodiments of the present invention.

Next, disturbance torque selection processing by the disturbance torque selection unit 16 of the failure diagnosis device 3 according to one or more embodiments will be described with reference to FIG. 3. FIG. 3 is a flowchart showing procedures of the disturbance torque selection processing by the disturbance torque selection unit 16.

As shown in FIG. 3, in step S1, the disturbance torque selection unit 16 acquires the disturbance torque values calculated by the robot control device 2. Each disturbance torque value represents a value at each moving position of each motion axis. Moreover, information indicating a data collection period for the disturbance torque values is also acquired at the same time.

Next, in step S2, the disturbance torque selection unit 16 acquires the emergency stop information on a facility from the production information database 21 in the production management device 4. In step S3, the disturbance torque selection unit 16 determines whether or not the emergency stop of the facility occurred in the collection period for the acquired disturbance torque values. The processing proceeds to step S4 in the case of determination that the emergency stop occurred. On the other hand, the processing proceeds to step S5 in the case of determination that the emergency stop did not occur.

In step S4, the disturbance torque selection unit 16 deletes only the disturbance torque values at the time of occurrence of the emergency stop out of the acquired disturbance torque values, and then the processing proceeds to step S5. In step S5, the disturbance torque selection unit 16 records the acquired disturbance torque values into the disturbance torque database 17, and terminates the disturbance torque selection processing according to one or more embodiments.

By selecting the disturbance torque values through the above-described processing, the disturbance torque database 17 stores and accumulates only the disturbance torque values that do not include abnormal values attributed to the emergency stop of the facility.

[Failure Diagnosis Processing]

Figure 4:
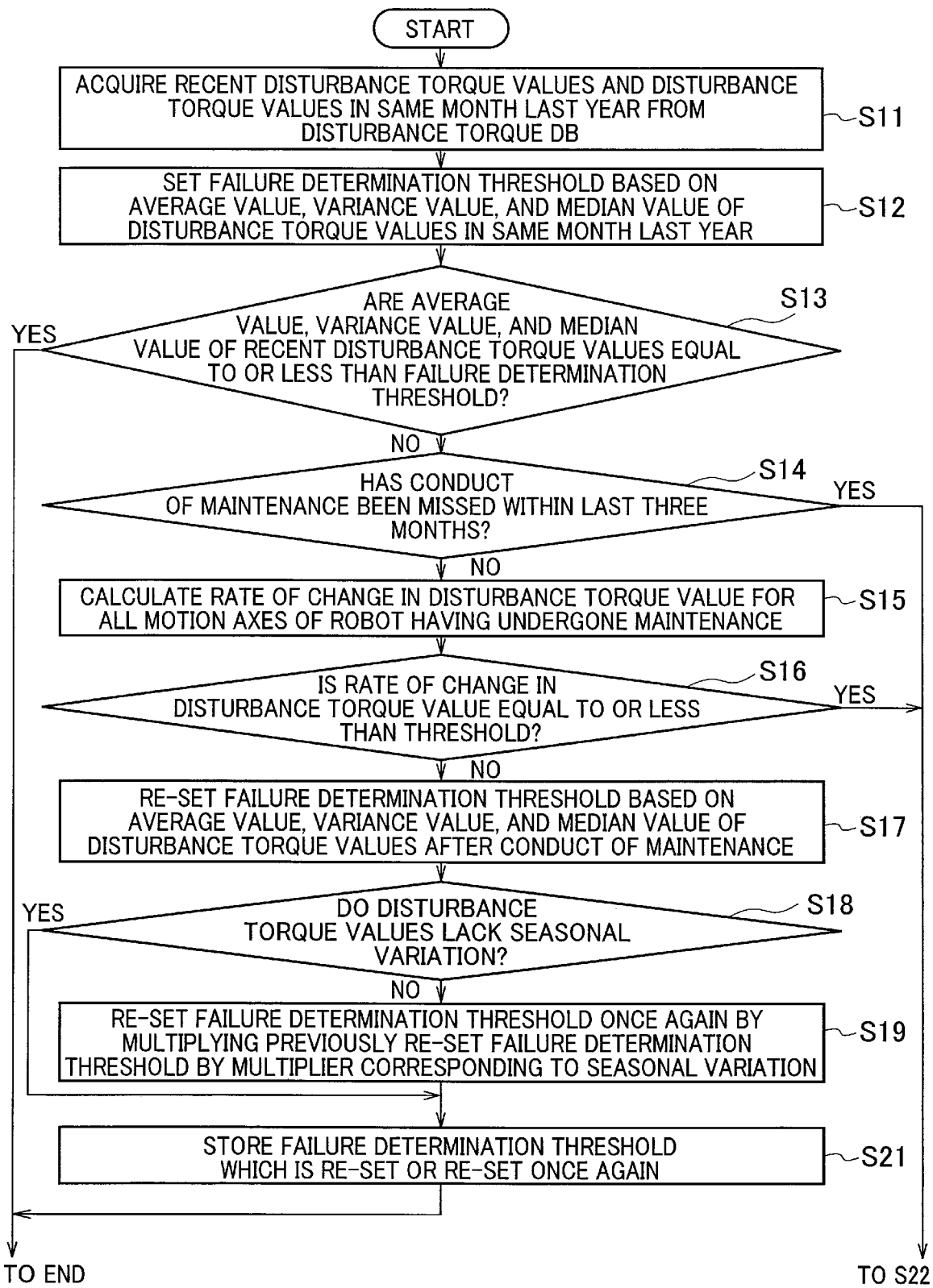
FIG. 4 is a flowchart showing procedures of failure diagnosis processing by the failure diagnosis device according to one or more embodiments of the present invention.
Figure 5:
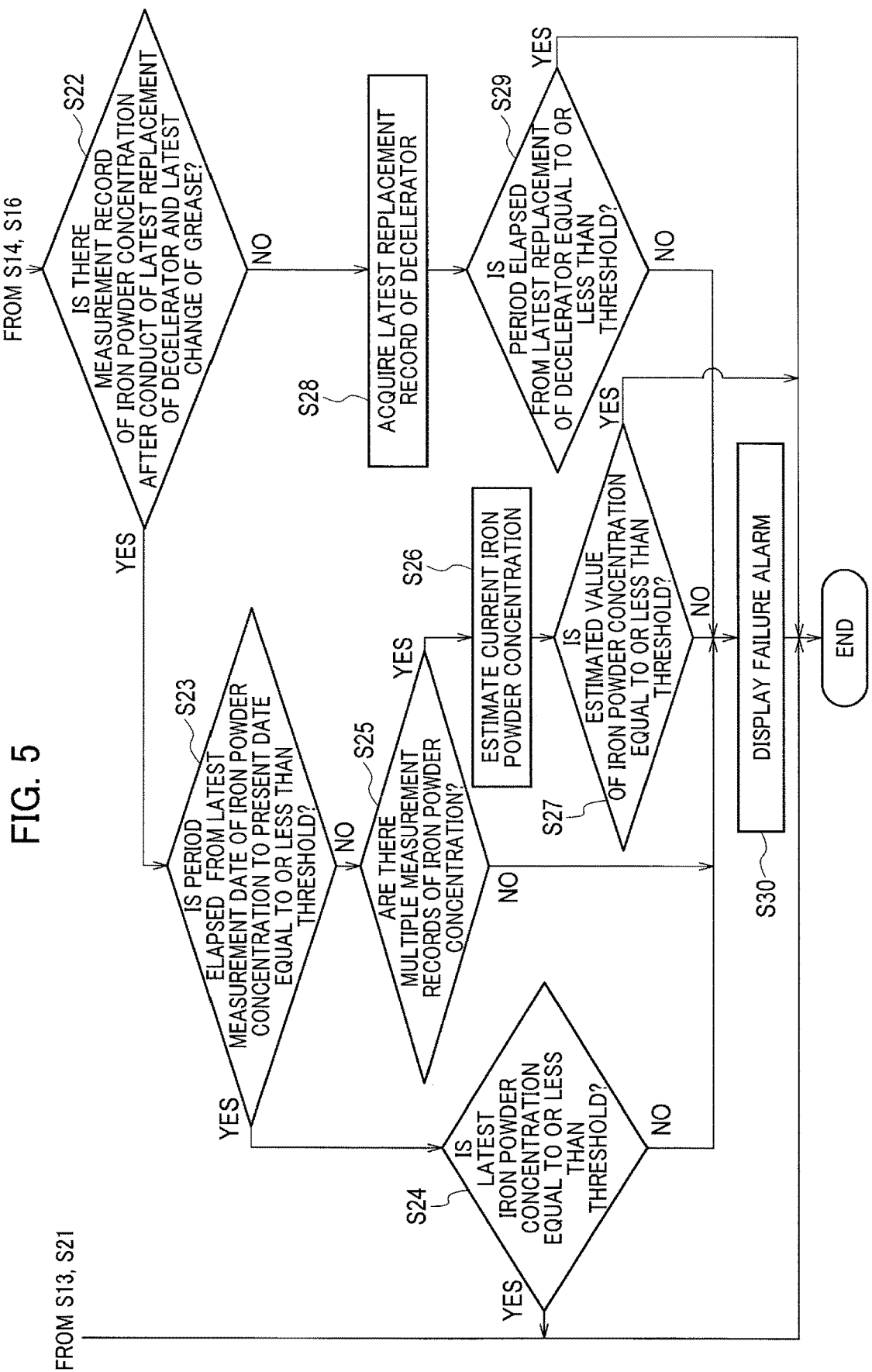
FIG. 5 is another flowchart showing procedures of failure diagnosis processing by the failure diagnosis device according to one or more embodiments of the present invention.

Next, failure diagnosis processing by the failure diagnosis unit 18 of the failure diagnosis device 3 according to one or more embodiments will be described with reference to FIGS. 4 and 5. FIGS. 4 and 5 are flowcharts showing procedures of the failure diagnosis processing by the failure diagnosis unit 18.

As shown in FIGS. 4 and 5, in step S11, the failure diagnosis unit 18 acquires the recent disturbance torque values as well as disturbance torque values in the same month last year as the date the diagnosis takes place in a lump from the disturbance torque database 17. In step S12, based on the disturbance torque values in the same month last year as the date the diagnosis takes place, the failure diagnosis unit 18 calculates at least one (or more) of an average value, a variance value, and a median value thereof, and then calculates and sets a failure determination threshold based on the calculated value. For example, any one of the average value, the variance value, and the median value may be set to the failure determination threshold or two or more of these values may be set to the failure determination thresholds.

In step S13, the failure diagnosis unit 18 calculates at least one (or more) of the average value, the variance value, and the median value of the recent disturbance torque values, and determines whether or not the calculated value is equal to or less than the failure determination threshold set in step S12. Then, if the calculated value out of the average value, the variance value, and the median value of the recent disturbance torque values is equal to or less than the failure determination threshold, then the failure diagnosis unit 18 determines that a failure is not occurring, and immediately terminates the failure diagnosis processing according to one or more embodiments. On the other hand, if the calculated value out of the average value, the variance value, and the median value of the recent disturbance torque values is larger than the failure determination threshold, then the failure diagnosis unit 18 determines that there is a possibility of a failure, and the processing proceeds to step S14.

In step S14, the failure diagnosis unit 18 determines whether or not maintenance has been conducted within the last three months based on the data accumulated in the maintenance record database 19. Then, if no maintenance has been conducted, the failure diagnosis unit 18 determines that the failure is occurring, and the processing proceeds to step S22. On the other hand, the processing proceeds to step S15 for determining the effect of the maintenance task when the maintenance has been conducted within the last three months.

In step S15, the failure diagnosis unit 18 calculates the rate of change in disturbance torque value before and after the conduct of the maintenance task for all the motion axes of the robot which underwent the maintenance task. The robot that underwent the maintenance task includes the multiple motion axes, and some of the motion axes underwent the maintenance task while other motion axes did not undergo the maintenance task. This is due to the reason that some motion axes have to undergo a maintenance task frequently while other motion axes do not have to undergo a maintenance task for a long period of time. Here, the rate of change in disturbance torque value is calculated for all these motion axes.

In step S16, the failure diagnosis unit 18 determines whether or not each rate of change in disturbance torque value calculated in step S15 is equal to or less than a predetermined threshold. When the rate of change is equal to or less than the predetermined threshold, the failure diagnosis unit 18 determines that there is no effect of the maintenance task and that a failure is occurring, and the processing proceeds to step S22. On the other hand, when the rate of change in disturbance torque value is larger than the predetermined threshold, the failure diagnosis unit 18 determines that there is an effect of the maintenance task, and the processing proceeds to step S17.

In step S17, the failure diagnosis unit 18 calculates at least one (or more) of an average value, a variance value, and a median value of disturbance torque values after the conduct of the maintenance, and calculates and re-sets a failure determination threshold based on the value.

In step S18, the failure diagnosis unit 18 determines whether or not there is a seasonal variation in the disturbance torque values of any of the joint axes. The processing proceeds to step S21 when there is not the seasonal variation or proceeds to step S19 when there is the seasonal variation. Here, the determination as to whether or not there is the seasonal variation in the disturbance torque values is made by using a degree of correlation between fluctuations in external temperature in each season and the disturbance torque values, for example. Such determination can be made by checking separately accumulated data of the external temperatures with the data of the disturbance torque values.

In step S19, the failure diagnosis unit 18 re-sets a failure determination threshold once again by multiplying the failure determination threshold that is re-set in step S17 by a constant (a coefficient) corresponding to the seasonal variation.

In step S21, the failure diagnosis unit 18 stores the failure determination threshold that is re-set or the failure determination threshold that is re-set once again into the memory, and terminates the failure diagnosis processing according to one or more embodiments.

In step S22, in order to execute the re-determination of the motion axis diagnosed as the failure, the re-determination unit 25 accesses the maintenance record database 19 and determines whether or not there is the measurement record of the iron powder concentration after the conduct of the latest replacement of the decelerator and the latest change of the grease. The iron powder concentration is significantly changed when the maintenance such as the replacement of the decelerator and the change of the grease takes place. This is why the determination is made as to whether or not there is the measurement record of the iron powder concentration after the conduct of the maintenance. Then, the processing proceeds to step S23 when there is the measurement record of the iron powder concentration, or proceeds to step S28 when there is no such a measurement record of the iron powder concentration.

In step S23, the re-determination unit 25 determines whether or not a period elapsed from the latest measurement date of the iron powder concentration to the present date is equal to or less than a predetermined threshold. The processing proceeds to step S24 when the elapsed period is equal to or less than the predetermined threshold, or proceeds to step S25 when the elapsed period exceeds the predetermined threshold. If the period elapsed from the latest measurement date of the iron powder concentration to the present date is elongated, it is likely that the iron powder concentration is increased during that period. Accordingly, the use of the measurement result after a lapse of a long period is avoided.

In step S24, the re-determination unit 25 determines whether or not the latest measurement value of the iron powder concentration is equal to or less than a predetermined threshold. When the latest measurement value is equal to or less than the predetermined threshold, the re-determination unit 25 determines that a failure is not occurring, and terminates the failure diagnosis processing according to one or more embodiments. On the other hand, when the latest measurement value of the iron powder concentration is larger than the predetermined threshold, the re-determination unit 25 determines that a failure is occurring, and the processing proceeds to step S30. Here, an iron powder concentration with which determination of a failure is feasible may be obtained and set in advance as the predetermined threshold by using previous data, experiments, and the like.

In step S25, the re-determination unit 25 determines whether or not there are multiple measurement records of the iron powder concentration. Even in the case of the old measurement records determined as overdue after the elapsed period in step S23, it is still possible to estimate the current iron powder concentration in accordance with the least-square method by using the multiple records. Accordingly, the processing proceeds to step S26 when there are the multiple measurement records of the iron powder concentration. On the other hand, if there are not multiple measurement records of the iron powder concentration, then it is not possible to estimate the current iron powder concentration. Hence, the re-determination unit 25 determines that the failure is occurring, and the processing proceeds to step S30.

In step S26, the re-determination unit 25 calculates the estimated value by estimating the current iron powder concentration in accordance with the least-square method and the like by using the multiple measurement records of the iron powder concentration.

In step S27, the re-determination unit 25 determines whether or not the estimated value of the iron powder concentration thus estimated is equal to or less than a predetermined threshold. When the estimated value is equal to or less than the predetermined threshold, the re-determination unit 25 determines that a failure is not occurring, and terminates the failure diagnosis processing according to one or more embodiments. On the other hand, when the estimated value of the iron powder concentration is larger than the predetermined threshold, the re-determination unit 25 determines that a failure is occurring, and the processing proceeds to step S30. Here, an iron powder concentration with which determination of a failure is feasible may be obtained and set in advance as the predetermined threshold by using previous data, experiments, and the like.

In step S28, the re-determination unit 25 accesses the maintenance record database 19 and acquires the latest replacement record of the decelerator.

In step S29, the re-determination unit 25 determines whether or not a period elapsed from the latest replacement date of the decelerator to the present date is equal to or less than a predetermined threshold. A failure is unlikely to occur immediately after the replacement of the decelerator. Accordingly, when the elapsed period is equal to or less than the predetermined threshold, the re-determination unit 25 determines that a failure is not occurring, and terminates the failure diagnosis processing according to one or more embodiments. On the other hand, when the elapsed period exceeds the predetermined threshold, the re-determination unit 25 determines that a failure is occurring, and the processing proceeds to step S30.

In step S30, the failure diagnosis unit 18 displays a failure alarm on the corresponding joint axis on a display screen of a not-illustrated monitor that is installed as an attachment to the failure diagnosis device 3, and the failure diagnosis processing according to one or more embodiments is terminated.

As described above in detail, according to the failure diagnosis device 3 of one or more embodiments, a motion axis is diagnosed as a failure when a disturbance torque value is larger than a failure determination threshold, and re-determination of the failure on the motion axis which is diagnosed as the failure is conducted based on a previous maintenance record and a previous inspection result. In this way, it is possible to diagnose a failure by using the maintenance record and the inspection result other than the disturbance torque value, and thus to improve failure diagnosis accuracy while preventing erroneous determination to diagnose as a failure in spite of being normal as a matter of fact.

Meanwhile, when there is a measurement record of an iron powder concentration within a predetermined period in the past regarding the motion axis subject to the re-determination, the failure diagnosis device 3 according to one or more embodiments determines that the motion axis subject to the re-determination is normal if a measurement value of the iron powder concentration recorded in the measurement record is equal to or less than a predetermined threshold. In this way, it is possible to diagnose a failure based on the measurement record of the iron powder concentration other than the disturbance torque value, and thus to improve the failure diagnosis accuracy while preventing erroneous determination to diagnose as a failure in spite of being normal as a matter of fact.

In addition, when there is no measurement record of the iron powder concentration within the predetermined period in the past regarding the motion axis subject to the re-determination, the failure diagnosis device 3 according to one or more embodiments calculates an estimated value by estimating a current iron powder concentration. Then, the failure diagnosis device 3 determines that the motion axis subject to the re-determination is normal if the estimated value is equal to or less than a predetermined threshold. In this way, it is possible to diagnose a failure based on the estimated value of the iron powder concentration other than the disturbance torque value, and thus to improve the failure diagnosis accuracy while preventing erroneous determination to diagnose as a failure in spite of being normal as a matter of fact.

Meanwhile, when there is no measurement record of the iron powder concentration within the predetermined period in the past regarding the motion axis subject to the re-determination, the failure diagnosis device 3 according to one or more embodiments acquires a replacement record of a decelerator of the motion axis subject to the re-determination. Then, the failure diagnosis device 3 determines that the motion axis subject to the re-determination is normal if there is the replacement record of the decelerator within a predetermined period in the past. In this way, it is possible to diagnose a failure based on the replacement record of the decelerator other than the disturbance torque value, and thus to improve the failure diagnosis accuracy while preventing erroneous determination to diagnose as a failure in spite of being normal as a matter of fact.

Although embodiments of the present invention are described above, it should be understood that the descriptions and the drawings constituting part of this disclosure are not intended to limit this invention. Various alternative embodiments, examples, and application techniques will be obvious to those skilled in the art from this disclosure. While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

1 robot
2 robot control device
3 failure diagnosis device
4 production management device
5 robot arm
6 servo motor (motor)
7 pulse coder
8 decelerator
9 operation integrated control unit
10, 15, 20 communication unit
11 servo control unit
12 disturbance torque calculation unit
13 status data acquisition unit
14 servo amplifier unit
15 disturbance torque selection unit
16 disturbance torque database
17 failure diagnosis unit
18 maintenance record database
21 production information database
25 re-determination unit
100 failure diagnosis system

The invention claimed is:

1. A failure diagnosis device applicable to a mechanical device provided with motors independent of one another as sources to respectively drive motion axes, comprising:
a processor configured to:
acquire a moving position of each of the motion axes and a disturbance torque value applied to each of the motion axes every predetermined period, and
diagnose a failure of the mechanical device, wherein diagnosing the failure comprises:
- diagnosing one motion axis of the motion axes as a failure when the disturbance torque value is larger than a predetermined failure determination threshold, the predetermined failure determination threshold being set based on a previous disturbance torque value without using a previous replacement record of motor drive systems in the motion axes and a previous measurement result of grease changed in the motion axes,
- conducting validation of the failure on the one motion axis, which is diagnosed as the failure by the processor, based on the previous replacement record and the previous measurement result when the processor diagnoses the one motion axis as the failure, and
- generating a failure diagnosis based on the failure and the validation of the failure.

2. The failure diagnosis device according to claim 1, wherein, when there is a measurement record of an iron powder concentration within a previous predetermined period regarding the one motion axis subject to the validation, the processor determines that the one motion axis subject to the validation is normal if a measurement value of the iron powder concentration recorded in the measurement record is equal to or less than a predetermined threshold.

3. The failure diagnosis device according to claim 1, wherein, when there is no measurement record of an iron powder concentration within a previous predetermined period regarding the one motion axis subject to the validation, the processor calculates an estimated value by estimating a current iron powder concentration using a measurement record of the iron powder concentration before the previous predetermined period, and determines that the one motion axis subject to the validation is normal if the estimated value is equal to or less than a predetermined threshold.

4. The failure diagnosis device according to claim 1, wherein, when there is no measurement record of an iron powder concentration within a previous predetermined period regarding the one motion axis subject to the validation, the processor determines that the one motion axis subject to the validation is normal if there is a replacement record of a decelerator of the one motion axis subject to the validation within the previous predetermined period.

5. The failure diagnosis device according to claim 1, wherein the processor further:
- determines whether a maintenance has been conducted on the mechanical device within a predetermined preceding time period, and
- calculates at least one of an average value, a variance value, and a median value of disturbance torque values if the maintenance has been conducted on the mechanical device within the predetermined preceding time period and resets the predetermined failure determination threshold based on the calculation.

6. A failure diagnosis method for a failure diagnosis device applicable to a mechanical device provided with motors independent of one another as sources to respectively drive motion axes, comprising:
- acquiring a moving position of each of the motion axes and a disturbance torque value applied to each of the motion axes every predetermined period;
- diagnosing a failure of the mechanical device;
- diagnosing, via the failure diagnosis device, one motion axis of the motion axes as a failure when the disturbance torque value is larger than a predetermined failure determination threshold, the predetermined failure determination threshold being set based on a previous disturbance torque value without using a previous replacement record of motor drive systems in the motion axes and a previous measurement result of grease changed in the motion axes;
- conducting, via the failure diagnosis device, validation of the failure on the one motion axis, which is diagnosed as the failure, based on the previous replacement record and the previous measurement result when the processor diagnoses the one motion axis as the failure; and
- generating, via the failure diagnosis device, a failure diagnosis based on the failure and the validation of the failure.

* * * * *